E. & T. REFSUM.
ART OF MOLDING HOLLOW ARTICLES IN SAND BY MEANS OF DIVIDED PATTERNS.
APPLICATION FILED OCT. 1, 1907.

925,724.

Patented June 22, 1909.

Witnesses.
Jesse N. Lutton
B. V. Sommers

Inventors.
Edvard Refsum
Thomas Refsum
by Henry Orth Jr.
Atty.

UNITED STATES PATENT OFFICE.

EDVARD REFSUM AND THOMAS REFSUM, OF DRAMMEN, NORWAY, ASSIGNORS TO BRÖDR. REFSUMS STÖBERI & MEK, VAERKSTED, OF DRAMMEN, NORWAY, AND HOLST & FLEISCHER, OF CHRISTIANIA, NORWAY.

ART OF MOLDING HOLLOW ARTICLES IN SAND BY MEANS OF DIVIDED PATTERNS.

No. 925,724.  Specification of Letters Patent.  Patented June 22, 1909.

Application filed October 1, 1907. Serial No. 395,445.

*To all whom it may concern:*

Be it known that we, EDVARD REFSUM and THOMAS REFSUM, subjects of the King of Norway, both residing at Drammen, Norway, have invented certain new and useful Improvements in the Art of Molding Hollow Articles in Sand by Means of Divided Patterns; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to the art of molding hollow articles in sand by means of divided patterns and has for its object to provide means and a procedure of working which greatly simplifies the molding of such articles.

Heretofore the core had to be formed for itself (sometimes from another material than the mold proper) and after special careful treatment, including very often a drying operation, to be placed in the mold so that the extremities of the core were supported in the cavities left in the mold by the coreprints on the pattern.

According to our invention this procedure is greatly simplified, our method enabling us to form the core simultaneously with forming the mold and of usual sand without any special treatment, the core being formed within the divided pattern and the latter being removed from the mold in such way, that the core will remain supported in the mold without having been removed from the place, where it was molded.

In order to explain our invention so that it may be fully understood, we shall in connection with the annexed drawing describe how the mold for a short piece of straight pipe, open in both ends, may be formed and how the pattern for such workpiece is made. Any one familiar with foundry practice will then easily be able to apply the invention to other work of more complicated form such as tees, branchpipes, bends, traps, or hollow articles closed in one or both ends.

Figure 1:
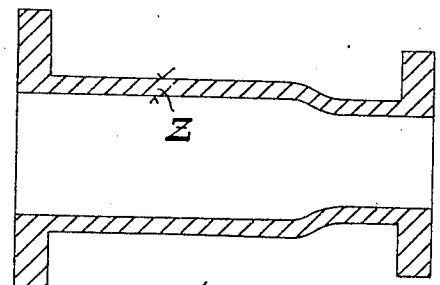
Figure 2:
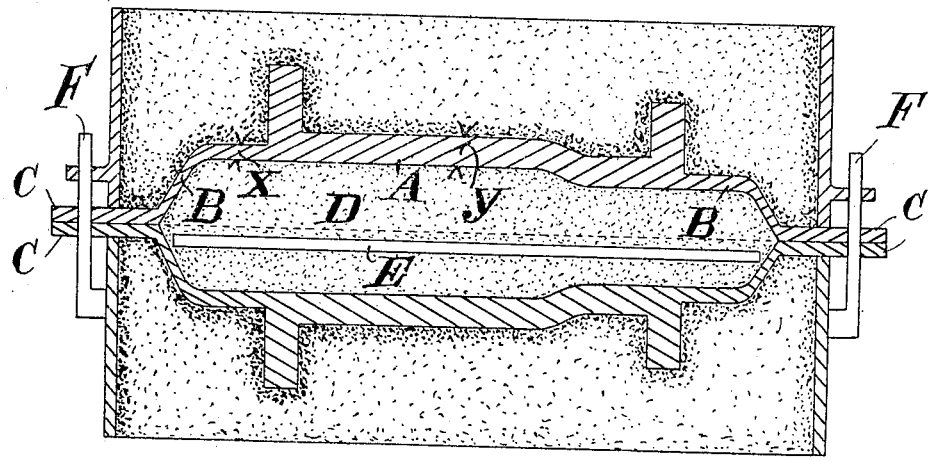
Figure 3:
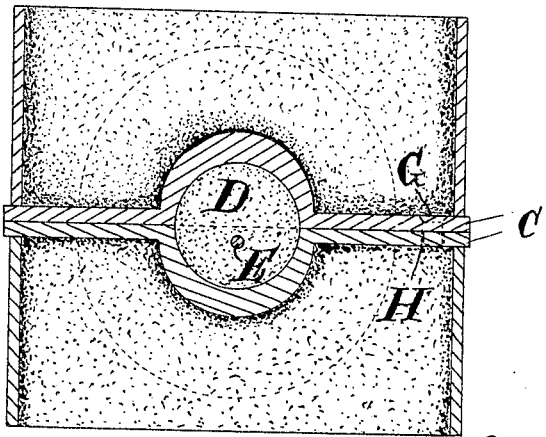

Figure 1 is a longitudinal section through the piece of pipe to be cast. Fig. 2 is a vertical longitudinal section through a flask, in which the pattern for forming the mold for casting the pipe shown in Fig. 1, is embedded in the sand. Fig. 3 is a cross section of the same.

The pattern is divided in two halves, each of which is composed of three portions viz: the pattern proper A having outside and inside the exact form of the outside and the inside of the pipe; the core prints B having outside and inside congruent surfaces; and a plate C forming a frame or base around the two first named parts. The thickness of this plate corresponds exactly to the thickness $x$ of the part B, measured at the top, and the thickness $y$ of the part A is exactly the sum of the thickness $z$ of the pipe to be cast and $x$. It will be seen, that in this manner the sandbody D within the pattern will represent the core with projecting extremities. E is a corepin. The plates C have corresponding perforations, through which the guidepins F of the flask pass.

When making mold with this pattern the following working steps are taken. First the two halves of the core are formed in the two halves of the pattern; the latter are then placed along each other and clapped together like a book. Some small tapered pins G on one of the halves corresponding with holes H in the other insures the correct fitting together of the pattern - halves. The two halves of the pattern thus placed together are set upon the nowel supported by the flanges C, as shown in Fig. 2, and the cope is then placed over the nowel and pattern containing the core. Sand is packed around one half of the pattern in the cope, in the well-known manner, and the cope together with the upper half of the pattern and the entire core is removed from the nowel. The nowel is now turned over and filled with sand in the same manner; the half of the pattern in the nowel is removed and the latter placed on top the cope and core. The cope and nowel are now inverted, the cope removed from the nowel and the remaining half of the pattern removed from the cope, whereupon the latter is again placed on the nowel and the mold is completed.

It may of course be suitable to place some staples on the core before the nowel and cope are placed over it, especially when the pipe to be cast is long, or it is closed at one end, so the core only at one end has projections resting in the mold. If a piece of casting is to be cast, which is fully closed, so that the core can not be supported by means of projections, it will have to be supported exclusively by staples.

When tees, branchpipes etc. are to be cast, corepins will have to be used, which may, after the casting is ready, be taken to pieces, they being composed of sticks tapped together or provided with tapered ends fitting into corresponding holes.

As will be easily understood the invention may also be used for molding more complicated hollow castings, necessitating the use of several flasks or patterns divided in more than two parts; of most importance we, however, consider the invention in its use for casting curved pipes having thin walls.

Claim:

A divided pattern comprising duplicate plates each having a flange and core print portions of the same thickness as that of the walls of the article to be molded and a pattern portion of twice the thickness of said walls.

In testimony that we claim the foregoing as our invention, we have signed our names in presence of two subscribing witnesses.

EDVARD REFSUM.
THOMAS REFSUM.

Witnesses:
   JOH. VAALER
   AUG. OLSEN.